June 21, 1955
A. W. NELSON ET AL
2,711,026
WIRE MEASURING DEVICE
Filed May 17, 1952
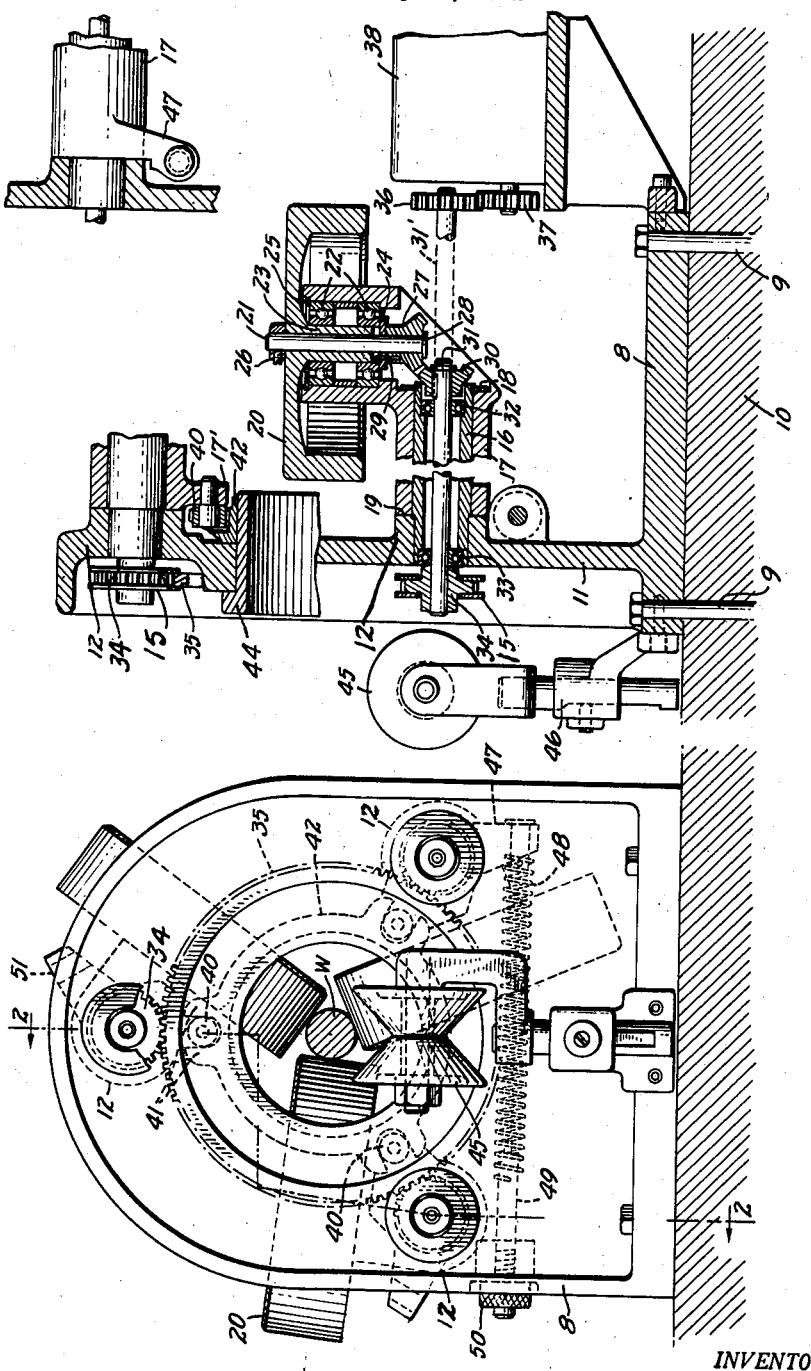
INVENTORS
SIDNEY E. BORGESON
ALDEN W. NELSON
BY
*Paul Kolisch*
ATTORNEY

United States Patent Office 2,711,026
Patented June 21, 1955

2,711,026

WIRE MEASURING DEVICE

Alden W. Nelson, Pawtucket, and Sidney E. Borgeson, Cranston, R. I., assignors to The James L. Entwistle Co., Providence, R. I., a copartnership Application May 17, 1952, Serial No. 288,508

4 Claims. (Cl. 33—129)

This invention has to do with improvements in wire measuring devices.

It is important in the manufacturing of wire, cable, and the like to know the linear measurement of the wire at a selected point. Devices for doing this as the wire is moved along from one operation or station to another are known. It is the purpose of the present invention to improve on such devices by simplifying them and making them cheaper while improving on their overall performance.

The wire to be measured is moved by some means such as a takeup reel, which forms no part of the present invention. A plurality of wheels, preferably three, are disposed at equal distances from one another around the wire and the rims of the wheels contact the wire at points lying on a common plane transverse to the wire.

A feature of the invention is the mountings for said wheels which permit them to accommodate a wide range of wire diameters as, for instance, when a knot has been tied in the wire and its diameter has been doubled. In the operation of high speed wire making machinery it is important not to have to stop the machinery so that the measuring device can pass this abnormal portion of wire. According to the present invention, the measuring device will accommodate such wire without causing stoppage.

According to a feature of the invention, all three wheels are mechanically interlocked so that they not only rotate at the same speed, but are equally moved with respect to the wire, and all three always contact the wire with the same amount of pressure controlled by a single spring connected to one of the wheels.

These and other features of the invention will be explained in greater detail with references to the drawings, in which Fig. 1 is a side elevation of the device, Fig. 2 is a cross section on lines 2—2 of Fig. 1, and Fig. 3 is an enlarged fragmentary portion of Fig. 1.

The device has a supporting frame 8 which is suitably mounted by bolts 9 on a bench 10. An upright member 11 of frame 8 supports three bosses 12 having holes bored therethrough. The construction of each boss and associated mechanism is identical and only one will be described.

A sleeve 16 is press fitted through a boss and supports a right angular bearing bracket 17. A retaining ring 18 holds bracket 17 against face 19 of the boss. A wire measuring wheel 20 whose rim contacts wire W is mounted with a shaft 21 on bracket 17 by means of two pairs of ball bearings 22 on hub 23 of wheel 20. Ball bearings 22 are held in place by a collar 24 and a retaining ring 25. A collar 26 is suitably secured on one end of shaft 21 and a bevel gear 27 on the other end. A shoulder 28 on shaft 21 bears against bevel gear 27 to hold the assembly together. By means of a pin 29 which connects the bevel gear with collar 24 and hub 23 of the wheel, a driving connection between the wheel and the bevel gear is maintained. A mating bevel gear 30 keyed to one end of a shaft 31 meshes with bevel gear 27. Shaft 31 is supported near either end by ball bearings 32, 33 in sleeve 16. On the end of shaft 31 opposite bevel gear 30 a spur pinion 34 is mounted which meshes with a large ring gear 35 which is common to and meshes with all three spur pinions 34. The three pinions 34 serve as the sole radial support for ring gear 35, while the washers 15 of nylon or other suitable material on either side of pinions 34 provide spaced annular flanges thereon whereby to maintain the ring gear 35 in mesh with the pinions 34 by preventing relative endwise movement thereof. In this manner wheels 20 are drivably connected and thus will all rotate at the same speed.

Shaft 31 in one of the bosses is extended as shown at 31' in dotted lines (Fig. 2) and has a gear 36 mounted on it which meshes with a gear 37 connected to a counting mechanism generally indicated at 38 which indicates in a well-known manner the linear measurement of wire passing through the device.

It is important that all three wheels 20 move with respect to the wire simultaneously and that they all continue to contact the wire as it passes through, whether it is of normal diameter or has some abnormality, such as a knot, that materially increases the diameter. To this end, the bearing brackets 17 are interconnected for simultaneous angular adjustment by means of a spider ring 42, or the like, mounted on a sleeve 44, journaled in the annular opening in the upstanding support 11, and having a plurality of radially extending, bifurcated projections 41, on its outer periphery, each of which coacts with a pivoted roller 40, mounted on one of a pair of radially extending arms 47, provided at one end of each of the brackets 17, as best shown in Fig. 1. Each of the others of the arms 47 is provided with an aperture 51 therethrough, for a purpose hereinafter described. While member 42 is shown as ring shaped, it could be otherwise shaped as long as it can be connected to each bracket 17. Any radial movement of a wheel 20 as by increase or decrease of the wire diameter will produce an angular displacement in bracket 17 supporting the wheel and will be immediately translated via ring 42 to the other two wheels to maintain them at the same distance from the wire.

A wheel 45 for guiding and supporting wire W as it passes through the device is vertically adjustable to accommodate wires of varying diameter and is mounted on a bracket 46 suitably fastened to frame 8.

In order to maintain all three wheels 20 in constant and even pressure with wire W, a rotatable arm 47 which is part of bracket 17 is connected to one end of a spring 48 whose other end is connected to an adjustable screw 49 fastened to frame 8 by a nut 50. Since all of the wheels 20 are mechanically tied together by ring 42, spring 48 will exert the same tension on all three wheels, continually urging them towards one another and into firm contact with wire W, thereby providing good support for the wire.

By inserting a rod or the like in aperture 51, in arm 47 on the uppermost of a bracket 17 and exerting pressure to rotate the bracket, all the wheels may be retracted in order to permit insertion or adjustment of wire in the device as will be understood.

What I claim is:

1. Apparatus of the character described comprising an upstanding support having an annular opening centrally thereof, three shafts journaled transversely of said support in parallel, angularly spaced relation about said opening, a pinion including flange means forming an annular groove with and about the toothed periphery thereof secured on one end of each of said shafts, an angular bearing bracket having radially extending arms at one end thereof journaled on the intermediate portion of each of said shafts, said bracket including a pivoted roller on one of said arms, a bevel gear secured on each opposite end of said shafts, a wire measuring wheel having a stub shaft secured axially thereof including a bevel gear secured on one end of said stub shaft journaled in each of said bearing brackets with the respective pairs of bevel gears in mesh, a ring gear supported solely by said pinions and maintained in mesh therewith by said flange means whereby said wheels are coupled for rotation at one and the same speed, and sleeve means journaled in said annular opening mounting an annular member having radially extending bifurcated projections thereon engaging the roller carried by one arm of each of said bearing brackets whereby said wheels are collectively shiftable radially of the axial center of said annular opening.

2. Apparatus according to claim 1, and in which a counting mechanism is drivably coupled to one of said parallel shafts.

3. Apparatus according to claim 2, and in which a retractile spring is connected to and between said support and one of said bearing brackets for biasing said wheels toward the axial center of the annular opening in said support.

4. Apparatus according to claim 3, and in which a sheave pulley is adjustably mounted on the upstanding support to guide a strand axially of the sleeve means journaled in said upstanding support.

References Cited in the file of this patent

UNITED STATES PATENTS

| | | |
|---|---|---|
| 1,341,830 | Ackley | June 1, 1920 |
| 1,425,430 | Wikander | Aug. 8, 1922 |
| 1,513,181 | Powell | Oct. 28, 1924 |
| 2,081,102 | Blue | May 18, 1937 |
| 2,085,264 | Lyon | June 29, 1937 |
| 2,232,956 | Mathey | Feb. 25, 1941 |